Aug. 4, 1953    J. B. ELIASON    2,647,322
DISTANCE AND ANGLE MEASURING DEVICE
Filed May 5, 1949
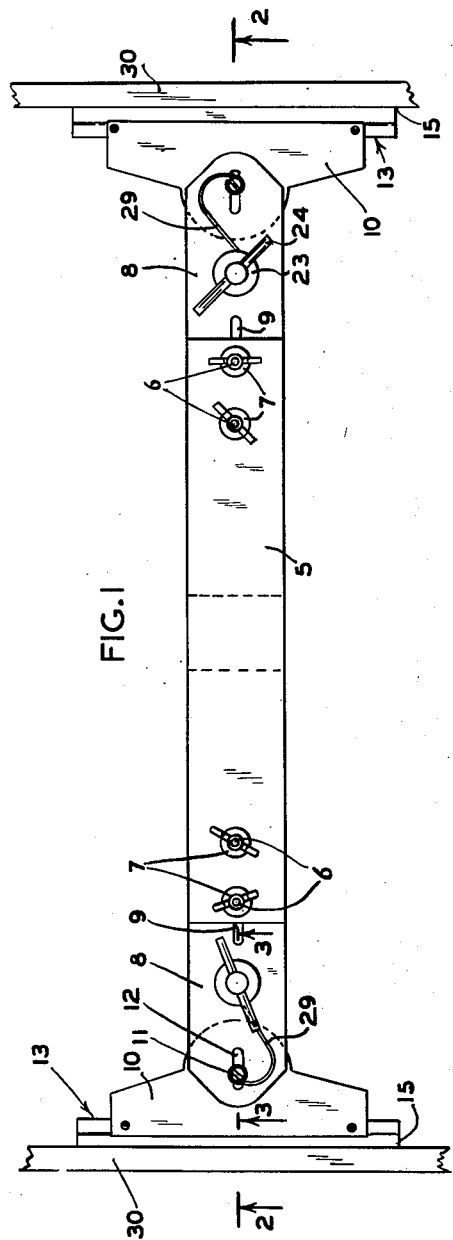
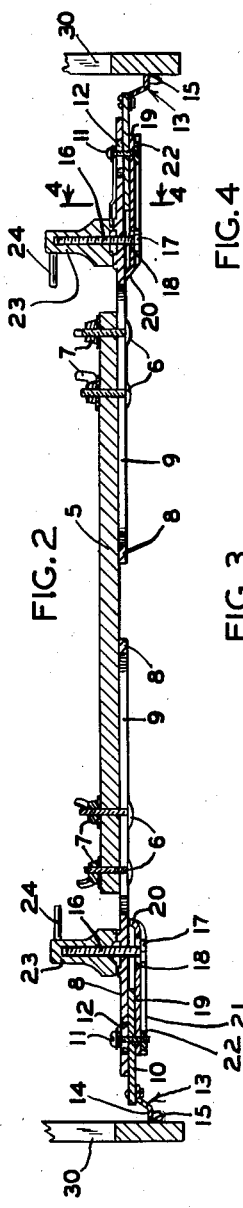
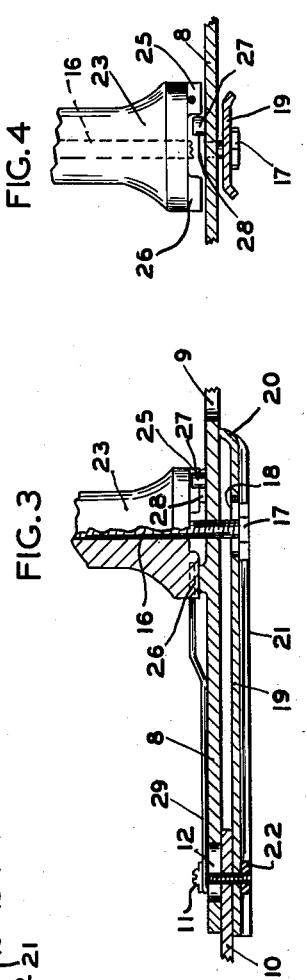
INVENTOR.
JOSEPH B. ELIASON
BY
*Williamson + Williamson*
ATTORNEYS Patented Aug. 4, 1953

2,647,322

UNITED STATES PATENT OFFICE 2,647,322

DISTANCE AND ANGLE MEASURING DEVICE

Joseph B. Eliason, Minneapolis, Minn.

Application May 5, 1949, Serial No. 91,478

7 Claims. (Cl. 33—98)

This invention relates to measuring instruments and more particularly for instruments or tools for use in measuring distances between and the relative angles of two spaced structural portions. It is of particular advantage in connection with various types of carpentry such as in the building of stairways, where the exact length and the angle of the ends of the treads and risers should be determined in order to make the parts fit properly. It is a tool which not only will work with accuracy but will greatly reduce the time required by the carpenter in measuring and fitting such parts.

The present invention is an improvement upon a similar device disclosed in my co-pending application, Serial 29,605, filed May 27, 1948, on Distance Angle Measuring Instrument.

An object of the invention is to provide a measuring instrument which is simply constructed and easily adjustable and wherein the device can be set for a general length and finally quickly and easily adjusted and locked in the exact measuring position and at the desired angular relationship to the work.

The above and other objects and advantages of the invention will more fully appear from the following description made in connection with the accompanying drawings, wherein like reference characters refer to the same parts throughout the views, and, in which:

Fig. 1 is a plan view of an embodiment of the invention.

Fig. 2 is a longitudinal section taken on line 2—2 of Fig. 1.

Fig. 3 is an enlarged fragmentary sectional detail taken approximately on the line 3—3 of Fig. 1, and Fig. 4 is an enlarged fragmentary detail taken approximately on line 4—4 of Fig. 2.

The body of the device includes a central elongated member 5 having a pair of threaded studs 6 at each end thereof with wing nuts 7 thereon. The studs 6 are shown lying along the longitudinal center of the main central body section 5. Extending from each end of the central body section 5 is an elongated section 8 having a central longitudinal slot 9 thereon. The studs 6 pass through the slots 9 as shown best in Fig. 2, and it will be seen that the sections 8 can be locked in longitudinally extended positions by means of said studs and the wing nuts 7.

On the outer end of each body section 9 is a cross-head 10. A stud 11 extends through each of the cross-heads and through a slot 12 in the outer end of each section 8.

The T-head 10 has a straightedge member 13 thereon which normally lies at right angles to the longitudinal axis of the main body of the device. The straightedge 13 has a downwardly offset portion 14 and one side of each straightedge member 13 is provided with a downwardly extending ear 15. The portion 14 of the straight edge is offset downwardly so that it will contact the surface of the work being checked and provide a support for the entire tool and each of the lugs 15 will engage an edge of the work such as a portion of a stair construction so that the tool will be extended between two points to be checked on a nearly straight line, which is the shortest distance between the points being checked.

Extending through each of the body sections 8 is a stud 16 whose lower end is provided with a head 17. The stud 16 extends upwardly through a slot 18 in a locking plate 19. This plate lies beneath the cross-head 10 and has one end thereof connected to the stud 11, which moves in the slot 12 in the body section 8. The opposite end of the locking plate 19 is curved upwardly as at 20 to bear against the underside of each body section 8. The end of the locking plate 19, which is connected to the stud 11, is slidable longitudinally on said stud, and the edges 21 of the locking plate are turned upwardly to provide a guideway for a nut 22 on the lower end of the stud 11.

Threaded on the upper end of the stud 16 is a knob 23 having a handle 24 extending therethrough. The head 17 of the stud 16 is held against rotation by the flanges or turned edges 21 of the locking plate 19, so that the knob 23 can be turned relative to the stud 16.

The underside of the knob 23 is provided with a downwardly extending abutment member 25 and a downwardly extending cam follower 26. The body section 8 is provided with an upwardly extending abutment 27 thereon which lies in the path of movement of the stop abutment 26 to limit rotary movement of said knob 23. A cam 28 extends upwardly from the upper surface of each body section 8 and lies in the path of movement of the cam follower 26. The cam 28 and the stop element 27 are so located that when the cam follower 26 rides to the top of the cam the abutment 25 will engage the stop 27. When the cam follower 26 rides up on the cam 28 the stud 16 will be pulled upwardly and the clamping plate 19 will tightly clamp the T-head 10 between said clamping plate and the body section 8.

Extending between each of the studs 11 and the underside of the knob 23 is a piece of spring wire 29 which is bowed as shown in Fig. 1. When the knob 23 at either end of the device is rotated in a counter-clockwise direction as viewed in Fig. 1, the spring 29 will exert a force on the stud 11 causing the T-head to be pushed longitudinally outwardly relative to the body of the device. As shown in Fig. 1, the tool lies between a pair of boards 30 which may be the diagonal side rails of a stairway. The device is set by adjustment of the sections 3 relative to the section 5 to a length slightly short of the distance between the boards 30, and the knobs 23 are then turned to cause the straightedges 13 to lie against the boards 30. The spring wire members 29 permit the T-heads 10 to stop before the knobs 23 are turned to their locked positions with the locking plates 19, whereupon the tool is secured with the T-heads at the exact angular relationship of the boards 30 and at the exact distance between said boards. The tool can then be placed upon a board which is intended to be made into a stair tread or riser and it can be marked off to the exact desired size by running a pencil along the outer edges of the straightedges 13.

The particular setting of the straightedges can be quickly released by turning the knobs 23 in a clockwise direction. The springs 29 are of sufficient strength to pull the cross-heads 10 slightly inwardly, the studs 11 moving inwardly in the slots 12. Then the tool is in condition for measuring the next adjacent tread or riser.

This device has been described as being used in connection with the construction of stairways of wood but, of course, it could be put to use in connection with other types of construction such as the building of shelving, and in other cases where length and end angulation must be determined.

In connection with the building of a stairway, it has been proved that a carpenter can very accurately fit the several pieces together so that the finished job is better looking and he can actually construct a stairway in considerably less time than if my tool is not used. Consequently, it not only improves the looks of the finished job but it reduces the cost of construction.

It will, of course, be understood that various changes may be made in the form, details, arrangement and proportions of the various parts without departing from the scope of my invention.

What I claim is:

1. In a measuring instrument, an elongated main body portion having a pair of longitudinally movable end portions, a pair of connections between said end portions and said main body portion operable to move said end portions relative to said main body portion and each including an operating member, and said connections being resilient to permit movement of said end portions relative to said main body portion and said operating members.

2. The structure in claim 1 and said operating members having locking means associated therewith, and said locking means being connected to said main body portion and the adjacent longitudinally movable end portion to secure said portions against relative movement.

3. In a measuring instrument, a longitudinally extensible body having means for positively locking the same in fixed positions, a pair of end portions additionally movable longitudinal of said body and relative to the remainder of the body, a pair of operating members on said body, and a pair of resilient actuators connecting said operating members to said end portions, and said operating members having a locking means thereon.

4. In a measuring instrument an elongated body having a pair of longitudinally movable end portions, a pair of locking mechanisms carried by said body and adapted to immovably fix said movable end portions relative to the remainder of said body when said mechanisms are moved to locked position, and resilient actuator means connecting said locking mechanisms to said movable end portions for urging said end portions to move longitudinally of the remainder of said body when said locking mechanisms are moved toward locked or unlocked position.

5. The structure defined in claim 4, said resilient actuator means being arcuately shaped.

6. In a measuring instrument, an elongated body having a pair of longitudinally movable end portions, a pair of movable locking devices carried by said body for holding said movable end portions immovable relative to the remainder of said body while in locked position, and resilient means interconnecting each of said movable end portions with one of said locking devices whereby said movable end portions will be urged outwardly while said locking devices are being moved toward locked position.

7. In a measuring instrument an elongated body, having an elongated central section and a pair of separate and oppositely extending end sections connected to said central section for controlled relative longitudinal movement therebetween, a cross-head mounted on the outer end portion of each of said end sections for longitudinal and swinging movement relative thereto, locking mechanism mounted on each of said end sections and being adapted to immovably fix said cross-head relative to said end section, and resilient actuator means extending between each of said locking mechanisms and its respective cross-head for urging said cross-head to move longitudinally with respect to its end section when its locking mechanism is moved toward locked or unlocked position.

JOSEPH B. ELIASON.

References Cited in the file of this patent

UNITED STATES PATENTS

| Number | Name | Date |
|---|---|---|
| 1,601,138 | Moore | Sept. 28, 1926 |
| 2,536,359 | Eliason | Jan. 2, 1951 |

FOREIGN PATENTS

| Number | Country | Date |
|---|---|---|
| 110,034 | Germany | Apr. 23, 1908 |